US006391072B1

(12) United States Patent
Garg

(10) Patent No.: US 6,391,072 B1
(45) Date of Patent: May 21, 2002

(54) ABRASIVE GRAIN

(75) Inventor: Ajay K. Garg, Northborough, MA (US)

(73) Assignee: Saint-Gobain Industrial Ceramics, Inc., Worcester, MA (US)

( * ) Notice: Subject to any disclaimer, the term of this patent is extended or adjusted under 35 U.S.C. 154(b) by 0 days.

(21) Appl. No.: 09/564,257

(22) Filed: May 4, 2000

(51) Int. Cl.$^7$ .................................................. C09K 3/14
(52) U.S. Cl. .............................. 51/309; 51/296; 51/306; 51/298; 264/44
(58) Field of Search .......................... 51/309, 296, 306, 51/298; 501/80, 84, 127; 264/42, 44

(56) References Cited

U.S. PATENT DOCUMENTS

| | | | | |
|---|---|---|---|---|
| 4,086,067 A | * | 4/1978 | Busch et al. ................... | 51/309 |
| 4,623,364 A | | 11/1986 | Cottringer et al. | |
| 4,657,754 A | | 4/1987 | Bauer et al. | |
| 4,960,441 A | | 10/1990 | Pellow et al. | |
| 5,009,676 A | | 4/1991 | Rue et al. | |
| 5,114,891 A | * | 5/1992 | Kunz et al. ................... | 51/309 |
| 5,221,294 A | * | 6/1993 | Carman et al. ................ | 51/296 |
| 5,527,369 A | * | 6/1996 | Garg ........................... | 51/309 |
| 5,593,467 A | * | 1/1997 | Monroe ....................... | 51/309 |

* cited by examiner

Primary Examiner—Michael Marcheschi
(74) Attorney, Agent, or Firm—David Bennett

(57) ABSTRACT

Alpha alumina abrasive grits which are particularly well-suited to medium to low pressure grinding applications wherein the grits comprise uniformly dispersed microvoids.

7 Claims, 1 Drawing Sheet

ABRASIVE GRAIN

BACKGROUND OF THE INVENTION

Figure 1:
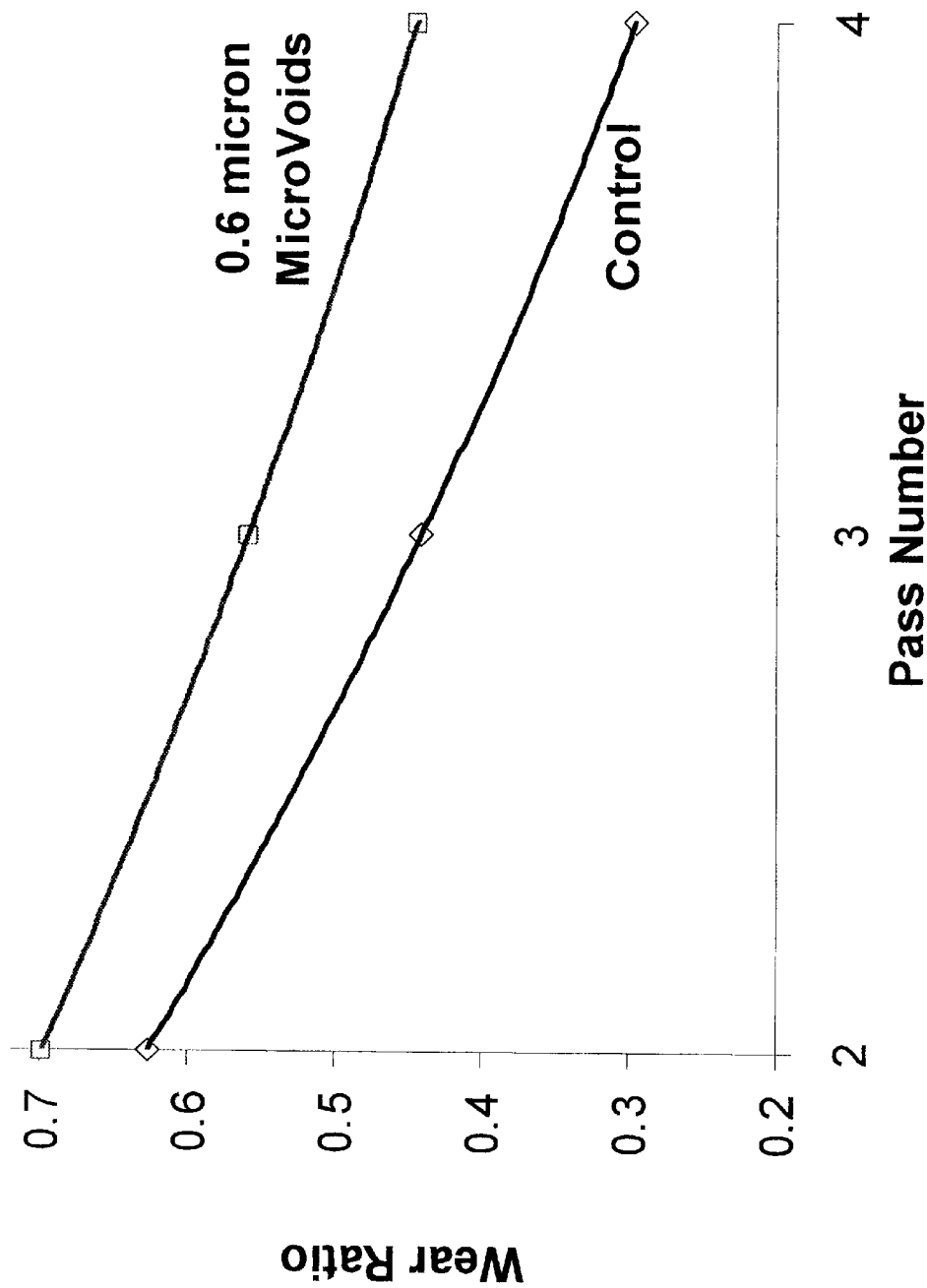

This invention relates to abrasive grain and specifically to alumina abrasive grain that has been made using a sol-gel process.

In such a process an alpha alumina precursor which is usually boehmite is formed into an aqueous sol, optionally in the presence of a seed material effective to reduce the temperature at which alpha alumina is formed upon heating or modifying agents. The sol is then caused to gel, usually by the addition of acid, and the gel is then dried and fired to form alpha alumina. Prior to firing the dried gel can be crushed to abrasive sized particles since this process is less demanding than after the conversion to alpha has been accomplished. If desired modifying additives such as yttria and rare earth metal oxides can be incorporated into the sol or into the dried gel prior to firing.

Such processes produce abrasive grain with very fine crystal structures and this proves to be a distinct advantage over alumina abrasive grits produced by a fusion process. It appears that, in use, the abrasive grit fractures to split off fine crystals thus exposing a fresh cutting surface. By contrast grits produced by a fusion process are made up of much larger crystals and when such an abrasive grit contacts a workpiece the cutting edges on the grit are gradually worn down and its cutting efficiency diminishes with the polishing process. This less efficient cutting is accompanied by an increase in friction and heat build up that can ultimately damage the surface of the workpiece. The life of the particular grit ends when the pressure is so great that the grit is ripped from the bond altogether. By providing for the removal of microcrystals of alumina from a grit, this polishing problem is much reduced with sol-gel alumina abrasive grits.

However this microfracture renewal process is active only when an abrasive tool comprising the sol-gel alumina abrasive grits is used under moderate to high pressure grinding conditions. When lower pressures are used, these may not be sufficient to induce microfracture and some polishing may be observed. There is therefore a need to develop an abrasive grit that is capable of efficient grinding at moderate to low pressures without excessive loss of grits in the process. The present invention provides such grits which are found to have utility at all grinding pressures but the very highest. The process by which they are made is simple, economic and extremely versatile in that it can be tailored to any set of grinding conditions likely to be encountered.

DESCRIPTION OF THE INVENTION

The present invention provides alumina abrasive grits having a crystal size less than five microns, in which essentially all the alumina is in the alpha form, and in which the density is from 3.6 to 3.9 g/cc and in which the abrasive grits comprise randomly dispersed essentially spherical voids with diameters of from 0.1 to 5 micrometers.

While essentially all the alumina is in the alpha form this does not preclude alumina being present also in a form such as a spinel or a magnetoplumbite structure where it is combined with other elements. This limitation is intended to convey therefore that there is essentially no transition phase alumina present in the grit.

The comparatively low density is achieved by the inclusion within the grits of a plurality of uniformly dispersed microvoids which are understood to means voids that are from 0.1 to 5, and preferably 0.5 to 2, micrometers in diameter randomly dispersed throughout the grit. Such microvoids are largely internal to the grain, (though of course some may appear at the surface), and therefore yield an apparent density for the grit that is typically only 85 to 95% of the theoretical density of alpha alumina, (3.98 g/cc). These microvoids provide a built-in fracture path that allow a grit to fracture under lower applied pressures and thus to regenerate cutting surfaces more readily without at the same time leading to unacceptable grit loss during the grinding.

The microvoids are randomly dispersed throughout the grit and by this is meant that they are not dispersed in any regular pattern but are generally found in relatively equal numbers at all parts of the grits. The microvoids are usually individual, essentially spherical shapes but occasionally two or more microvoids are sufficiently close to one another to become a single microvoid. The presence of such multiple structures is within the understanding of the definition of the present invention.

The microvoids can be incorporated into the grits by the addition to an alumina precursor sol of a material that will become uniformly dispersed within the dried gel formed from the sol but which will leave a void after firing to form alpha alumina abrasive grits.

In a preferred process for the production of alpha alumina abrasive grits comprising microvoids, an aqueous polymeric latex comprising particles of polymer that are from 0.1 to 5 micrometers in diameter is added to a boehmite sol in an amount that is from 0.03 to 0.3% by weight based on the weight of alumina, measured as alpha alumina, present in the sol, and the sol is then processed to produce alpha alumina abrasive grits. As indicated above this process typically comprises initially the gelation of the sol so as to fix the distribution of the various components dispersed therein such as modifiers and seeds to promote conversion to the alpha form. The gel is then dried and optionally further modified by incorporation of further modifiers by impregnation and then fired to produce the alpha alumina abrasive grits.

The firing process causes the latex particles to burn out leaving behind microvoids which may be slightly smaller in size that the original latex particles as a result of sintering during the firing which tends to eliminate interstitial voids within the crystal structure. It is therefore important to terminate sintering when the desired density has been reached.

In principle the microvoids can also be created by the incorporation of hollow spheres such as fly ash particles or even of naturally occurring organisms such as yeast or lycopodium powder. It is however essential that these be within the size range specified above and be readily dispersible in the sol without clumping. Hollow particles of a mineral such as for example fly ash can be used but generally it is difficult to obtain particles with the appropriately fine diameter.

The preferred form of creating the microvoids, as indicated above is through the incorporation of a polymer latex. The polymer can ne fully polymerized or a liquid oligomer provided this oligomer does not lose its particulate identity when mixed with the dispersion of the alpha alumina precursor. Polymers that can be used are generally thermoplastic, (though suitable thermosetting resins can be substituted), and include for example polystyrene, polybutadiene, fluoropolymers, polyvinylchloride and acrylate polymers and copolymers.

It is also possible to incorporate a powder of a material such as a carbonate which would decompose upon heating to give a gas which would create the microvoid in the structure. An example of such a compound is magnesium carbonate which decomposes to yield carbon dioxide at about 350° C., which is above the temperature at which the gel is dried. It is also insoluble in water and disperses readily in an aqueous medium such as a boehmite sol. Upon firing the residual MgO can act as a pinning agent by the formation of a spinel with alumina, which helps to maintain the low crystal dimensions. Other salts, which need not be limited to carbonates but could embrace also organic acid salts and water-insoluble decomposable salts, include nitrates and acetates.

The alpha alumina precursor dispersion can also comprise particles of a material effective to seed the conversion of the intermediate to the alpha form of alumina. Typically this seed will be alpha alumina particles with particulate sizes of from 0.01 to 1.0 micrometer. However other crystalline materials that are isostructural with alpha alumina and have lattice parameters that are close to those of alpha alumina, (such as alpha ferric oxide or a substance that forms this compound on firing), can be used. These have the effect of reducing the temperature of conversion to the alpha form and decreasing the size of the alumina crystals formed.

The alpha alumina precursor itself it preferably boehmite since this is well known to form a stable sol which can readily be gelled, for example by addition of an acid, such that a dispersion of void-forming particles in the sol can be stabilized upon gelation to preserve the uniformity of the dispersion throughout the balance of the process.

The formation of abrasive grits from the alumina dispersion can follow any of the conventional techniques. The dried gel can for example be comminuted to the desired range of grit sizes before the dried gel is fired. This is significantly easier than comminuting the fired material after conversion to the alpha form and sintering has begun, though both options can be used. It is also possible to extrude or mold the gel into shapes that are then fired to convert to the alpha form. This has the result of producing rod shaped particles that have distinct advantages for several applications. The partially dried gel can also be subjected to very rapid temperature rises so as volatilize water within the grits resulting in an explosive comminution. This procedure leads to grits with distinctly weak, (or elongated), shapes that have quite advantageous properties. It is intended that all such grit formation procedures should be embraced by the instruction to "form" abrasive grits.

DRAWINGS

FIG. 1 is a graph of data reported in Example 1.

DESCRIPTION OF PREFERRED EMBODIMENTS

The invention is now further described with specific reference to the following illustrative Examples which are not to be understood as implying any necessary limitation on the scope of the invention. These Examples show the beneficial effect on the grinding performance that arose from the incorporation of a minor amount of a polymer latex in a sol-gel process for the production of an alumina abrasive grit.

EXAMPLE 1

A stock gel production was prepared by adding 2,400 gm of boehmite, obtained from Condea under the trade name Dispural®, to 10 litres of deionized water. The mixture was stirred for 10 minutes using a laboratory lightning mixer and then 286.82 gm of ion-exchanged alpha alumina seeds were added followed by another five minutes of stirring. The mixture was gelled by addition of 178.75 gm of 70% nitric acid diluted in 7142.57 gm of deionized water and was stirred for a further ten minutes before being allowed to stand for 24 hours. The gel was then decanted and set aside as the "stock gel" for use in all the following experiments.

A latex dispersion was made by adding 1.5 gm of a 10% solids polystyrene latex to 99 gm of deionized water. The polystyrene latex contained 0.6 micrometer particles of polystyrene and was obtained from Sigma Chemicals under the trade name "LB-6". This latex dispersion was added to 420 gm of the stock gel and the mixture was stirred gently with a lightning laboratory mixer to avoid entrapment of air bubbles. Ion exchange beads, (40 gm of HCR-W2 H+16–40 mesh obtained from DOWEX), which had previously been washed twice with deionized water were stirred into the gel for 5 five minutes before being removed via an 80 mesh screen. This ion exchange procedure was repeated before addition to the gel of 6 gm of 70% nitric acid diluted with 20 gm of deionized water and mixed for five minutes.

The gel was then dried at 100° C. in a drying oven, crushed to −18 mesh and fired in a rotary furnace at 1250° C., spending 10 minutes in the hot zone.

The abrasive grits thus produced had a crystal size, as measured by the uncorrected intercept method of about 0.1 micrometer. The grits had a density of 3.85 gm/cc and a polished section viewed under an optical microscope revealed microvoids within the grit.

A control gain made exactly as described above but without the latex addition had a density of 3.88 gm/cc and a crystal size of about 0.1 micrometers. It showed no microvoids.

Abrasive grits were selected from the control and the product according to the invention. Each grit had a −30+35 mesh size. These were each subjected to a single point scratch test. In this test the grain was mounted on a 305 mm diameter steel wheel hub using a phenolic resin bond. A 52100 steel test piece was brought into contact with the wheel as it rotated at about 1600 rpm. The infeed of the grit was set at 10 microns and the surface was misted with an aqueous coolant to control the temperature. After each pass the workpiece was indexed laterally so as to contact a fresh piece of the steel. A total of five passes were made for each grit. After the testing the workpiece was observed under a Zygo profilometer to measure the cross-sectional area of each groove. Measurements were taken at the beginning of the test at grind intervals during the test. The "Wear Ratio" is determined by dividing the cross-sectional area of the groove being measured with the corresponding cross-sectional area at the first pass.

The results are shown in FIG. 1 which demonstrates clearly that the grit according to the invention showed a consistently higher wear ratio than the grit made without latex modification.

EXAMPLE 2

A stock gel was prepared by mixing 3200 gm of Disperal® boehmite available from Condea in 10,571.43 gm of deionized water with stirring for 10 minutes using a laboratory lightning mixer. This was then combined with 228.57 gm of 70% nitric acid diluted in 18 litres of deionized water with mixing for a further 10 minutes. This gel was then centrifuged at 3000 rpm for an hour and the supernatant liquid was combined with 850 gm of a ion-exchanged dispersion of alpha alumina seeds with 4% solids content and the whole was mixed for a further five minutes.

To five kilograms of the above gel mixture were added 15 gm of a 10% solids polystyrene latex similar in source and content to that used in Example 1 except that the particles had a 1.1 micrometer size, diluted with 200 gm of deionized water and the latex had been ultrasonicated for one minute. The mixture, which contained 0.3% of the polymer particles, was subjected a double ion-exchange procedure as in Example 1.

This mixture was then treated with 28 gm of 70% nitric acid diluted with 250 gm of deionized water and mixed for five minutes. This gel was then dried at 110° C. crushed in a Braun rolls crusher with a gap of 0.042 inch and fired in a rotary furnace with the hottest region at 1210° C. and the grits spending 10 minutes in the hot zone.

The grits obtained had a density of 3.85 gm/cc and a crystal size of about 0.1 micrometer. Grits produced in exactly the same way but without the latex addition had a similar crystal size but a density of 3.89 gm/cc. Grits according to the invention and conventional grits made in the same way without the latex addition were subjected to the same test as is outlined in Example 1 except that 80 grit samples were selected for testing and the workpiece was M7 steel. The results obtained showed that, after conclusion of the test the grits according to the invention had a wear ratio that was 162% that of the conventional grit.

What is claimed is:

1. A process for the production of alpha alumina abrasive grits which comprises:

a) forming an aqueous dispersion of an alpha alumina precursor;

b) uniformly dispersing void-forming particulates within the dispersion; drying and firing the uniform dispersion to burn out any organic material and convert the alpha alumina precursor to alpha alumina having uniformly dispersed microvoids therein with diameters from 0.1 to 5 micrometers in diameter and a density of from 3.6 to 3.9 g/cc; and c) forming abrasive grits.

2. A process according to claim 1 in which the grit formation is carried out before the alpha alumina precursor is fired to form alpha alumina.

3. A process according to claim 1 in which the void-forming particles are particles of a polymer latex.

4. A process according to claim 3 in which the polymer is a hydrocarbon polymer.

5. A process according to claim 2 in which the void forming particles are selected from the group consisting of organic solids, inorganic hollow particles and solid inorganic particles that on heating to temperatures at which alpha alumina is formed decompose to yield gases.

6. A process according to claim 1 in which the alpha alumina precursor further comprises seed particles effective to promote conversion to the alpha form.

7. A process according to claim 1 in which the alpha alumina precursor is boehmite.

* * * * *